(12) United States Patent
Kurimoto et al.

(10) Patent No.: US 12,551,834 B2
(45) Date of Patent: Feb. 17, 2026

(54) HONEYCOMB FILTER

(71) Applicant: NGK Insulators, Ltd., Nagoya (JP)

(72) Inventors: Yudai Kurimoto, Shanghai (CN);
Yasuyuki Furuta, Konan (JP);
Fumihiko Yoshioka, Novi, MI (US);
Tatsuya Ohashi, Chiryu (JP); Ayaka Sakai, Nagoya (JP); Ritsuko Teranishi, Nagoya (JP)

(73) Assignee: NGK INSULATORS, LTD., Nagoya (JP)

( * ) Notice: Subject to any disclaimer, the term of this patent is extended or adjusted under 35 U.S.C. 154(b) by 146 days.

(21) Appl. No.: 18/177,337

(22) Filed: Mar. 2, 2023

(65) Prior Publication Data

US 2023/0311047 A1 Oct. 5, 2023

(30) Foreign Application Priority Data

Mar. 30, 2022 (JP) ................................. 2022-057087

(51) Int. Cl.
*B01D 46/24* (2006.01)

(52) U.S. Cl.
CPC ... *B01D 46/2429* (2013.01); *B01D 46/24491* (2021.08); *B01D 46/24492* (2021.08); *B01D 46/249* (2021.08); *B01D 2279/30* (2013.01)

(58) Field of Classification Search
CPC .......... B01D 46/2429; B01D 46/24491; B01D 46/24492; B01D 46/249; B01D 2279/30
USPC .......................................................... 55/523
See application file for complete search history.

(56) References Cited

U.S. PATENT DOCUMENTS

| | | | |
|---|---|---|---|
| 2013/0062275 A1* | 3/2013 | Kobashi | B01D 39/2093 264/49 |
| 2018/0050333 A1* | 2/2018 | Okazaki | C04B 38/06 |
| 2019/0299147 A1 | 10/2019 | Yoshioka | |

FOREIGN PATENT DOCUMENTS

JP 2019-171318 A 10/2019

* cited by examiner

*Primary Examiner* — Jennifer Dieterle
*Assistant Examiner* — Qianping He
(74) *Attorney, Agent, or Firm* — BURR PATENT LAW, PLLC

(57) ABSTRACT

A honeycomb filter comprising a pillar-shaped honeycomb structure body having a porous partition wall disposed to surround a plurality of cells which serve as fluid through channels extending from a first end face to a second end face and a plugging portion provided at an open end on the first end face side or the second end face side of each of the cells, wherein the partition wall has an average number of branches of pores existing at the outermost surface of the partition wall of greater than 7.5 and less than 9.0.

3 Claims, 3 Drawing Sheets

HONEYCOMB FILTER

RELATED APPLICATIONS

The present application is an application based on JP 2022-057087 filed on Mar. 30, 2022 with Japan Patent Office, the entire contents of which are incorporated herein by reference.

BACKGROUND OF THE INVENTION

Field of the Invention

The present invention relates to a honeycomb filter. More specifically, the present invention relates to a honeycomb filter capable of effectively suppressing an increase in pressure loss caused by the deposition of particulate matter.

Description of the Related Art

Conventionally, a honeycomb filter using a honeycomb structure has been known as a filter for trapping particulate matter in exhaust gas emitted from an internal combustion engine such as an automobile engine, or a device for purifying toxic gas components such as CO, HC, NOx (see Patent Document 1). The honeycomb structure includes a partition wall made of porous ceramics such as cordierite and a plurality of cells defined by the partition wall. A honeycomb filter includes such a honeycomb structure provided with plugging portions so as to plug the open ends on the inflow end face side and the outflow end face side of the plurality of cells alternately. In other words, the honeycomb filter has a structure in which inflow cells having the inflow end face side open and the outflow end face side plugged and outflow cells having the inflow end face side plugged and the outflow end face side open are arranged alternately with the partition wall therebetween. In the honeycomb filter, the porous partition wall serves as a filter for trapping the particulate matter in exhaust gas (e.g., soot). Hereinafter, the particulate matter contained in exhaust gas may be referred to as "PM". The "PM" is an abbreviation for "Particulate Matter."

When PM such as soot is deposited on a partition wall, pressure loss of the honeycomb filter increases. For this reason, various studies have been conducted in order to suppress an increase in pressure loss of the honeycomb filter caused by the deposition of PM.

[Patent Document 1] JP-A-2019-171318

As a method of suppressing an increase in pressure loss of the honeycomb filter caused by the deposition of PM, for example, a method of increasing porosity of the partition wall is exemplified. It is also known that, experimentally, the increase in pressure loss is suppressed by making the size of pores existing at a surface of the partition wall uniform. However, the reason why the increase in pressure loss is suppressed by making the size of the pores existing at the surface of the partition wall uniform has not been clarified from the viewpoint of the pore structure of the partition wall.

The present invention has been made in view of the problems with the prior arts described above. According to the present invention, there is provided a honeycomb filter capable of effectively suppressing an increase in pressure loss caused by the deposition of PM.

SUMMARY OF THE INVENTION

From the viewpoint of the pore structure of the partition wall, the present inventors intensively studied the suppression of the increase in pressure loss of the honeycomb filter caused by the deposition of PM, and obtained the following findings. First, it was found that pressure loss of the honeycomb filter caused by the deposition of PM is affected by the number of branches of pores existing at the outermost surface of the porous partition wall. The above-described number of branches of the pores refers to the number of branches indicating the number in which one pore existing at the outermost surface of the partition wall is connected to another pore. Then, it was confirmed that when the number of branches of the pores increases, an increase in pressure loss caused by the deposition of PM is suppressed. From such findings, it was found that an increase in pressure loss of the honeycomb filter caused by the deposition of PM can be suppressed by specifying an average number of branches of the pores existing at the outermost surface of the porous partition wall, and thus the present invention has been completed. According to the present invention, there is provided a honeycomb filter to be described below.

[1] A honeycomb filter including: a pillar-shaped honeycomb structure body having a porous partition wall disposed to surround a plurality of cells which serve as fluid through channels extending from a first end face to a second end face; and a plugging portion provided at an open end on the first end face side or the second end face side of each of the cells, wherein the partition wall has an average number of branches of pores existing at the outermost surface of the partition wall of greater than 7.5 and less than 9.0.

[2] The honeycomb filter according to [1], wherein the partition wall has an average neck diameter of a neck partitioning the plurality of pores on a surface of the partition wall of 6.0 μm or more and less than 9.0 μm.

[3] The honeycomb filter according to [1] or [2], wherein a porosity of the partition wall is 45 to 65%.

[4] The honeycomb filter according to any one of [1] to [3], wherein an average pore diameter of the partition wall is 6.0 μm or more and 9.0 μm or less.

The honeycomb filter of the present invention can effectively suppress an increase in pressure loss of the honeycomb filter caused by the deposition of PM.

DESCRIPTION OF THE PREFERRED EMBODIMENTS

Hereinafter, embodiments of the present invention will be described, but the present invention is not limited to the following embodiments. Therefore, it should be understood that those in which modifications, improvements, and the like have been appropriately added to the following embodiments are within the scope of the present invention based on the ordinary knowledge of those skilled in the art without departing from the spirit of the present invention.

(1) Honeycomb Filter

Figure 1:
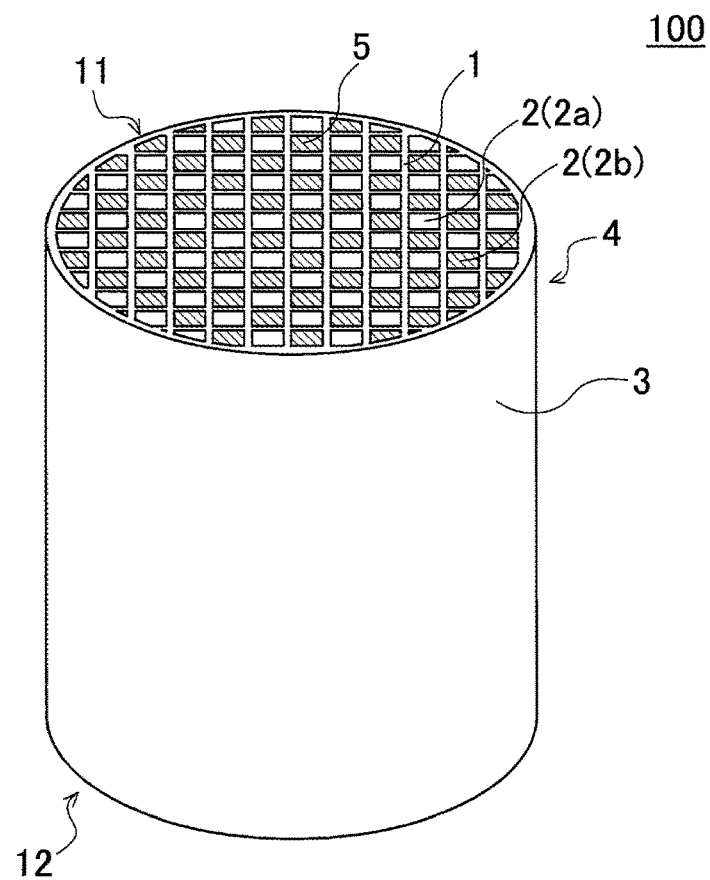
FIG. 1 is a perspective view schematically showing one embodiment of a honeycomb filter according to the present invention as viewed from an inflow end face side.
Figure 2:
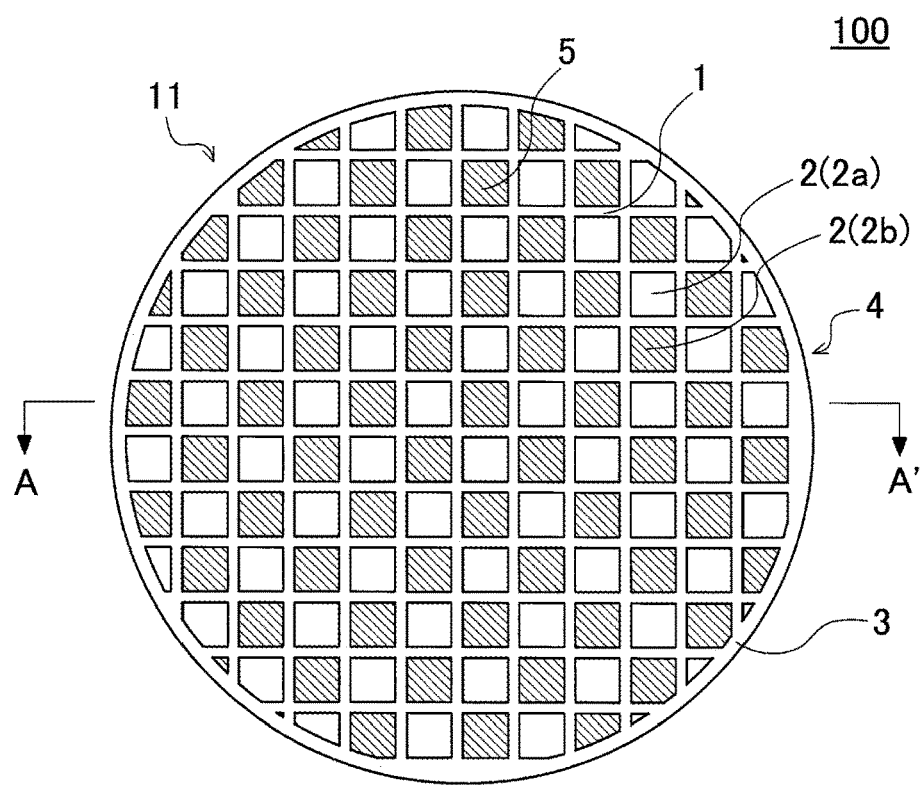
FIG. 2 is a plan view of the honeycomb filter shown in FIG. 1 as viewed from the inflow end face side.
Figure 3:
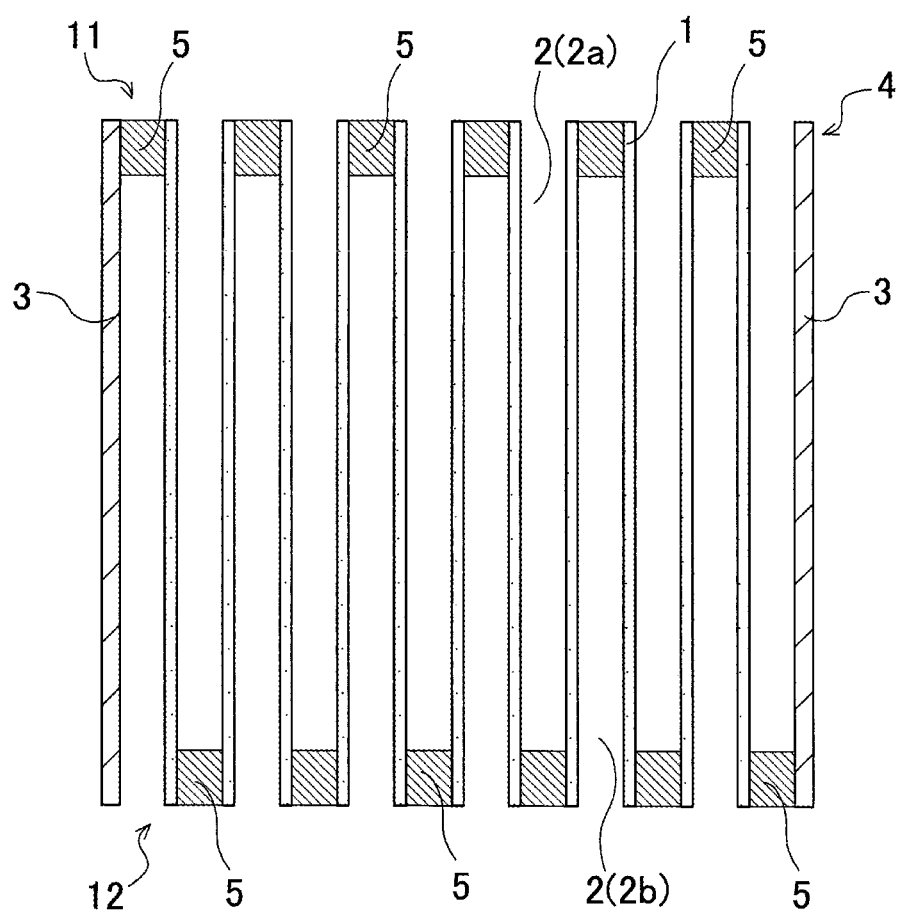
FIG. 3 is a sectional view schematically showing a section taken along the line A-A' of FIG. 2.

As shown in FIG. 1 to FIG. 3, a first embodiment of a honeycomb filter according to the present invention is the honeycomb filter 100 that includes a honeycomb structure body 4 and plugging portions 5. The honeycomb structure body 4 is a pillar-shaped structure including a porous partition wall 1 disposed so as to surround a plurality of cells 2 serve as fluid through channels extending from a first end face 11 to a second end face 12. In the honeycomb filter 100, the honeycomb structure body 4 is pillar-shaped and further includes a circumferential wall 3 on its circumferential side face. In other words, the circumferential wall 3 is disposed to encompass the partition wall 1 disposed in a grid pattern.

FIG. 1 is a perspective view schematically showing one embodiment of the honeycomb filter according to the present invention as viewed from an inflow end face side. FIG. 2 is a plan view of the honeycomb filter shown in FIG. 1 as viewed from the inflow end face side. FIG. 3 is a sectional view schematically showing a section taken along the line A-A' of FIG. 2.

The honeycomb filter 100 has main properties particularly in the configuration of the partition wall 1 constituting the honeycomb structure body 4. That is, in the partition wall 1 constituting the honeycomb structure body 4, the average number of branches of pores existing at the outermost surface of the partition wall 1 is greater than 7.5 and less than 9.0. With this configuration, it is possible to effectively suppress an increase in pressure loss of the honeycomb filter 100 caused by the deposition of PM. Here, "the number of branches of pores existing at the outermost surface of the partition wall 1" refers to the number of branches in which one pore existing at the outermost surface of the partition wall 1 is connected to another pore. The number of branches of pores existing at the outermost surface of the partition wall 1 is sometimes referred to as the "number of branches of the outermost surface pores" of the partition wall 1. The number of branches of the outermost surface pores of the partition wall 1 can be measured by a measuring method described below, and the measured average number of branches of the outermost surface pores is the average number of branches described above. Hereinafter, the average number of branches of the pores existing at the outermost surface of the partition wall 1 may be referred to as the "average number of branches of the outermost surface pores" in the partition wall 1.

When the average number of branches of the outermost surface pores of the partition wall 1 is 7.5 or less, a sufficient effect of suppressing an increase in pressure loss of the honeycomb filter 100 caused by the deposition of PM cannot be obtained. On the other hand, when the average number of branches of the outermost surface pores of the partition wall 1 is 9.0 or more, a crack tends to develop due to good communication of the pores, which is not preferable in terms of deterioration of the strength. The average number of branches of the outermost surface pores of the partition wall 1 is not particularly limited, but is preferably greater than 7.6 and less than 8.8, more preferably greater than 7.9 and less than 8.7.

The average number of branches of the outermost surface pores of the partition wall 1 can be measured by the following method. The data of the porous body constituting the partition wall 1 is obtained on the basis of three-dimensional scanning. Examples of the device used for the three-dimensional scanning include Xradia 520 Versa (product name) manufactured by Carl Zeiss Co., Ltd. The resolution in the X, Y, and Z directions is 1.2 μm each, and the resulting cube with each side of 1.2 μm is the voxel. The data obtained by the three-dimensional CT scanning is, for example, a luminance data for each coordinate of X, Y, and Z. The three-dimensional data of the porous body (hereinafter, also referred to as the "porous body three-dimensional data") can be obtained by binarizing such luminance data at a predetermined threshold value and determining whether it is a spatial voxel or an object voxel for each coordinate. The threshold value is determined by Otsu's method, for example, from the luminance distribution of the luminance data. For example, there is no particular limitation on the range for obtaining the data of the porous body of the partition wall 1. The range for obtaining the data of the porous body of the partition wall 1 can be appropriately determined according to the device used for three-dimensional scanning, and examples thereof include a range of 480 μm×480 μm×a thickness of the partition wall 1 (μm).

Figure 4:
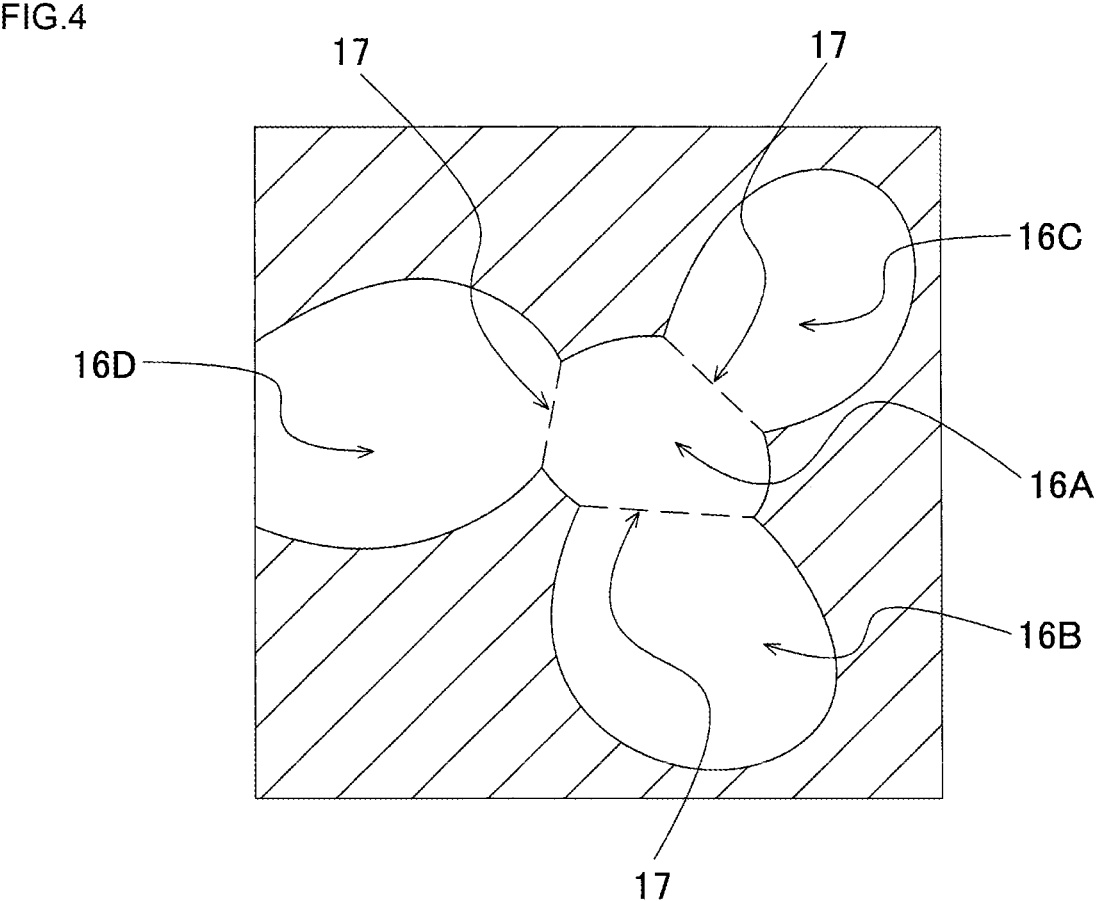
FIG. 4 is a schematic diagram for explaining a measuring method of the number of branches of pores.

Next, the space is segmented by the constricted part by WaterShed method with respect to the obtained porous body three-dimensional data. SNOW algorithm is implemented in the program, and the segmentation is performed by Water-Shed method. The number of pores adjacent to each of the segmented pores is defined as the number of branches. That is, the above-described "the space segmented by the constricted part" is regarded as a "pore", and the number of branches is obtained by measuring the number of pores adjacent to the pore. The average number of branches of the outermost surface pores is obtained by calculating and averaging the number of adjacent pores of each pore that is segmented pores located on the outermost surface (the pores in contact with the space outside the partition wall as a base material). For example, as shown in FIG. 4, when there are three constricted parts 17 in pores 16A, 16B, 16C, and 16D, the pore 16A is adjacent to the three pores 16B, 16C, and 16D via the constricted parts 17 (in other words, a neck). Therefore, the number of branches in the pore 16A is three, that is, the pores 16B, 16C, and 16D. FIG. 4 is a schematic diagram for explaining a measuring method of the number of branches of pores. The measuring method of the number of branches of the pores can be referred to "Jeff T. Gostick, Versatile and efficient pore network extraction method using marker-based watershed segmentation, PHYSICAL REVIEW E 96, 023307, (2017)", for example.

Further, in the partition wall 1 constituting the honeycomb structure body 4 as shown in FIGS. 1 to 3, the average neck diameter of the neck partitioning the plurality of pores on the surface of the partition wall 1 is preferably 6.0 μm or more and less than 9.0 μm, and more preferably 6.2 μm or more and less than 8.5 μm. When the average neck diameter is 6.0 μm or more and less than 9.0 μm, it is preferable in terms of trapping performance and catalytic coating performance. For example, when the average neck diameter is less than 6.0 μm, it is not preferable in that the catalyst is easily clogged at the neck. On the other hand, when the average neck diameter is 9.0 μm or more, it is not preferable in terms of trapping performance degradation.

The average neck diameter (μm) of the neck in the partition wall 1 can be measured by the following method. In the above-described measurement of the average number of branches of the outermost surface of pores of the partition wall 1, with respect to the segmented pores calculated from the porous body three-dimensional data, the "aggregate of voxels" between one segmented pore and another segmented pore adjacent to the one segmented pore is referred to as a "neck" that partitions the pores. A value obtained by multiplying the number of voxels constituting the neck by the square of the grid resolution (1.2 μm) (that is, the number of voxels×(1.2 μm)$^2$) is defined as a neck area. The average neck diameter is determined by $\sqrt{(\text{neck area}/\pi)}$.

In the honeycomb filter 100, a porosity of the partition wall 1 is preferably 45 to 65%, more preferably 56.0 to 60.0%, and particularly preferably 58.0 to 59.5%. The porosity of the partition wall 1 is a value measured by mercury press-in method. The porosity of the partition wall 1 can be measured by using Autopore 9500 (product name) manufactured by Micromeritics, for example. To measure the porosity, a part of the partition wall 1 may be cut out from the honeycomb filter 100 to prepare a test piece for the measurement. When the porosity of the partition wall 1 is less than 45%, the initial pressure loss of the honeycomb filter 100 may be increased. Further, when the porosity of the partition wall 1 exceeds 65%, the mechanical strength of the honeycomb filter 100 may decrease.

The honeycomb filter 100 has an average pore diameter of the partition wall 1 of preferably 6.0 µm or more and 9.0 µm or less, more preferably 6.5 µm or more and 8.5 µm or less, and particularly preferably 7.0 µm or more and 8.0 µm or less. The average pore diameter of the partition wall 1 is a value measured by a mercury press-in method. The average pore diameter of the partition wall 1 can be measured by using Autopore 9500 (product name) manufactured by Micromeritics, for example. The average pore diameter can be measured using the test piece described above for measuring porosity. The average pore diameter of the partition wall 1 is preferably 7 to 12 µm. The average pore diameter of the partition wall 1 is calculated value as a pore diameter, which gives half the volume of total pore volume by the mercury press-in method. When the average pore diameter of the partition wall 1 is less than 6.0 µm the transmission resistivity of the partition wall 1 increases and pressure loss may increase. On the other hand, when the average pore diameter of the partition wall 1 exceeds 9.0 µm, the filtration efficiency of the honeycomb filter 100 may deteriorate.

The thickness of the partition wall 1 is not particularly limited. For example, the thickness of the partition wall 1 is preferably 0.178 to 0.254 mm, and more preferably 0.191 to 0.241 mm. The thickness of the partition wall 1 can be measured by using a scanning electron microscope or a microscope, for example. If the thickness of the partition wall 1 is extremely thick, it may not be sufficiently effective to suppress an increase in pressure loss. If the thickness of the partition wall 1 is extremely thin, the trapping performance and the mechanical strength may be affected.

The material of the partition wall 1 is not particularly limited, and any porous material may be used as long as the average number of branches of the outermost surface pores of the partition wall 1 satisfies the numerical ranges described above. For example, the material of the partition wall 1 preferably includes at least one selected from a group consisting of cordierite, silicon carbide, silicon-silicon carbide composite material, cordierite-silicon carbide composite material, silicon nitride, mullite, alumina, and aluminum titanate. The material constituting the partition wall 1 is preferably a material including 90% by mass or more of the materials listed in the above group, is further preferably a material including 92% by mass or more of the materials listed in the above group, and is particularly preferably a material including 95% by mass or more of the materials listed in the above group. The silicon-silicon carbide composite material is a composite material formed using silicon carbide as an aggregate and silicon as a bonding material. The cordierite-silicon carbide composite material is a composite material formed using silicon carbide as an aggregate and cordierite as a bonding material. In the honeycomb filter 100 of the present embodiment, the material constituting the partition wall 1 is preferably a material containing cordierite as a main component.

The shape of the cells 2 formed in the honeycomb structure body 4 is not particularly limited. For example, the shape of the cells 2 in a section that is orthogonal to the extending direction of the cells 2 may include a polygonal shape, a circular shape, an elliptical shape, and the like. The polygonal shape can include a triangle, a quadrangle, a pentagon, a hexagon, an octagon, and the like. The shape of the cells 2 is preferably a triangle, a quadrangle, a pentagon, a hexagon or an octagon. Moreover, regarding the shapes of the cells 2, all the cells 2 may have the same shape or different shapes. For example, although not shown, quadrangular cells and octagonal cells may be mixed. Further, regarding the sizes of the cells 2, all the cells 2 may have the same size or different sizes. For example, although not shown, among the plurality of cells, some cells may be made to be large, and other cells may be made to be relatively smaller. In the present invention, the cells 2 mean the spaces surrounded by the partition wall 1.

The cell density of the cell 2 defined by the partition wall 1 is preferably 43 to 57 cells/cm$^2$, more preferably 47 to 54 cells/cm$^2$. With this configuration, the honeycomb filter 100 can be preferably used as a filter for purifying exhaust gas emitted from an automobile engine.

The circumferential wall 3 of the honeycomb structure body 4 may be configured integrally with the partition wall 1 or may be composed of a circumferential coat layer formed by applying a circumferential coating material to the circumferential side of the partition wall 1. For example, although not shown, the circumferential coat layer can be provided on the circumferential side of the partition wall after the partition wall and the circumferential wall are integrally formed and then the formed circumferential wall is removed by a well-known method, such as grinding, in a manufacturing process.

The shape of the honeycomb structure body 4 is not particularly limited. The shape of the honeycomb structure body 4 can be a pillar-shape in which the shape of the first end face 11 (for example, the inflow end face) and the second end face 12 (for example, the outflow end face) includes a circular shape, an elliptical shape, a polygonal shape, and the like.

The size of the honeycomb structure body 4, for example, the length from the first end face 11 to the second end face 12, and the size of a section orthogonal to the extending direction of the cells 2 of the honeycomb structure body 4, is not particularly limited. Each size may be selected as appropriate such that optimum purification performance is obtained when the honeycomb filter 100 is used as a filter for purifying exhaust gas.

In the honeycomb filter 100, the plugging portions 5 are disposed at the open ends on the first end face 11 side of predetermined cells 2 and at the open ends on the second end face 12 side of the remaining cells 2. If the first end face 11 is defined as the inflow end face, and the second end face 12 is defined as the outflow end face, then the cells 2 which have the plugging portions 5 disposed at the open ends on the outflow end face side and which have the inflow end face side open are defined as inflow cells 2a. Moreover, the cells 2 which have the plugging portions 5 disposed at the open ends on the inflow end face side and which have the outflow end face side open are defined as outflow cells 2b. The inflow cells 2a and the outflow cells 2b are preferably arranged alternately with the partition wall 1 therebetween. Thereby, a checkerboard pattern is preferably formed by the plugging portions 5 and "the open ends of the cells 2" on both end faces of the honeycomb filter 100.

The material of the plugging portions 5 is preferably a material that is preferred as the material of the partition wall 1. The material of the plugging portions 5 and the material of the partition wall 1 may be the same or different.

In the honeycomb filter 100, the partition wall 1 defining the plurality of cells 2 is preferably loaded with a catalyst for purifying exhaust gas. Loading the partition wall 1 with a catalyst refers to coating the catalyst onto the surface of the partition wall 1 and the inner walls of the pores formed in the partition wall 1.

(2) Manufacturing Method of Honeycomb Filter

There is no particular limitation on the manufacturing method of the honeycomb filter according to the present embodiment shown in FIGS. 1 to 3, and the honeycomb filter can be manufactured by the following method, for example. First, a plastic kneaded material is prepared to make a honeycomb structure body. The kneaded material for making honeycomb structure body can be prepared, for example, as follows. Talc, kaolin, alumina, aluminum hydroxide, silica, and the like are used as raw material powders, and these raw material powders can be prepared to obtain a chemical composition that contains silica in the range of 42 to 56% by mass, alumina in the range of 30 to 45% by mass, and magnesia in the range of 12 to 16% by mass.

In the honeycomb filter of the present embodiment, the average number of branches of the outermost surface pores of the partition wall is greater than 7.5 and less than 9.0. Examples of the manufacturing methods of such honeycomb filters include replacing fused silica, which is conventionally used as one of the raw materials, with porous silica, in the preparation of the kneaded material.

Next, the kneaded material thus obtained is subjected to extrusion so as to make a honeycomb formed body having a partition wall defining a plurality of cells, and an outer wall disposed to encompass the partition wall.

The obtained honeycomb formed body is dried by, for example, microwave and hot air, and the open ends of the cells are plugged using the same material as the material used for making honeycomb formed body, thereby making plugging portions. The honeycomb formed body may be further dried after making the plugging portions.

Next, a honeycomb filter is manufactured by firing the honeycomb formed body in which the plugging portions were made. A firing temperature and a firing atmosphere are different depending on the raw material, and those skilled in the art can select the firing temperature and the firing atmosphere that are the most suitable for the selected material.

Examples

The following describes the present invention more specifically by examples, but the present invention is not limited to those examples.

Example 1

A kneaded material was prepared by adding a pore former of 2.0 parts by mass, a dispersing medium of 1.0 parts by mass, and an organic binder of 6 parts by mass to a cordierite forming raw material of 100 parts by mass and mixing and kneading them. Methylcellulose was used as the organic binder. A potassium laurate soap was used as a dispersing agent. Water-absorbing polymer having the average particle diameter of 20 μm was used as the pore former. Talcum, kaolin, alumina, aluminum hydroxide, and porous silica were used as the cordierite forming raw material.

Next, the obtained kneaded material was molded using an extruder to make a honeycomb formed body. Next, the obtained honeycomb formed body was dried by high frequency dielectric heating, and then further dried using a hot air dryer. The shape of the cells in the honeycomb formed body was quadrangular.

Next, the plugging portions were formed in the dried honeycomb formed body. First, the inflow end face of the honeycomb formed body was masked. Next, the end portion provided with the mask (the end portion on the inflow end face side) was immersed in the plugging slurry, and the open ends of the cells without the mask (the outflow cells) were filled up with the plugging slurry. In this way, the plugging portions were formed on the inflow end face side of the honeycomb formed body. Then, the plugging portions were also formed in the inflow cells in the same manner for the outflow end face of the dried honeycomb formed body.

Next, the honeycomb formed body in which the plugging portions have been formed was dried with a microwave dryer, and further dried completely with a hot air dryer, and then both end faces of the honeycomb formed body were cut and adjusted to a predetermined size. The dried honeycomb formed body was then degreased and fired to manufacture the honeycomb filter of Example 1.

The honeycomb filter of Example 1 had the diameter of the end faces of 266.7 mm and the length in the extending direction of the cells of 228.6 mm. Further, the thickness of the partition wall was 0.191 mm and the cell density was 48 cells/cm$^2$.

On the honeycomb filters of Example 1, the porosity and the average pore diameter of the partition wall were measured in the following method. In addition, the average number of branches of the outermost surface pores of the partition wall and the average neck diameter at the surface of the partition wall were measured by the following methods. Table 1 shows the results.

TABLE 1

|  | Average number of branches of outermost surface pores [—] | Average neck diameter of surface [μm] | Porosity [%] | Average pore diameter [μm] | Pressure loss performance evaluation (Pressure loss increase value due to soot deposition) [kPa] | Trapping performance evaluation (Soot emission) [g/m$^3$] |
|---|---|---|---|---|---|---|
| Comparative Example 1 | 6.6 | 9.3 | 57.5 | 13.9 | 84 | $7.1 \times 10^{-8}$ |
| Comparative Example 2 | 7.0 | 7.4 | 56.2 | 8.6 | 126 | $7.4 \times 10^{-9}$ |

TABLE 1-continued

| | Average number of branches of outermost surface pores [—] | Average neck diameter of surface [μm] | Porosity [%] | Average pore diameter [μm] | Pressure loss performance evaluation (Pressure loss increase value due to soot deposition) [kPa] | Trapping performance evaluation (Soot emission) [g/m³] |
|---|---|---|---|---|---|---|
| Comparative Example 3 | 7.5 | 9.2 | 61.2 | 10.2 | 83 | $4.5 \times 10^{-8}$ |
| Example 1 | 8.4 | 8.4 | 60.0 | 10.1 | 67 | $1.8 \times 10^{-8}$ |
| Example 2 | 8.1 | 8.4 | 60.0 | 10.1 | 65 | $2.0 \times 10^{-8}$ |
| Example 3 | 8.3 | 9.0 | 59.5 | 10.3 | 65 | $2.2 \times 10^{-8}$ |
| Example 4 | 8.4 | 8.4 | 59.1 | 10.3 | 64 | $2.5 \times 10^{-8}$ |
| Example 5 | 7.8 | 7.8 | 56.2 | 8.0 | 77 | $2.3 \times 10^{-9}$ |
| Example 6 | 8.1 | 8.1 | 58.9 | 9.6 | 59 | $7.0 \times 10^{-9}$ |
| Example 7 | 8.5 | 6.7 | 58.0 | 7.0 | 60 | $1.6 \times 10^{-10}$ |

Porosity and Average Pore Diameter

The porosity and the average pore diameter of the partition wall were measured using Autopore 9500 (product name) manufactured by Micromeritics. In the measurement of the porosity and the average pore diameter, a part of the partition wall was cut out from the honeycomb filter to obtain a test piece, and the porosity was measured using the obtained test piece. The test piece was a rectangular parallelepiped having a length, a width, and a height of approximately 10 mm, approximately 10 mm, and approximately 20 mm, respectively. The sampling location of the test piece was set in the vicinity of the center of the honeycomb structure body in the axial direction.

Average Number of Branches of Outermost Surface Pores

First, the three-dimensional data of the porous body of the partition wall was measured by three-dimensional scanning. The three-dimensional scanning was performed using Xradia 520 Versa (product name) manufactured by Carl Zeiss Co., Ltd. The three-dimensional data of the porous body has a resolution in the X, Y, and Z directions of 1.2 μm each, and the resulting cube with each side of 1.2 μm is the voxel. The three-dimensional data of the porous body is a luminance data for each coordinate of X, Y, and Z. Next, the space was segmented by the constricted part by WaterShed method with respect to the three-dimensional data of the porous body. SNOW algorithm was implemented in the program, and the above segmentation was performed by WaterShed method. The average number of branches of the outermost surface pores was obtained by calculating and averaging the number of adjacent pores of each pore that is segmented pores located on the outermost surface (the pores in contact with the space outside the partition wall).

Average Neck Diameter

As for the segmented pores calculated from the three-dimensional data of the porous body in the measurement of the average number of branches of the outermost surface pores of the partition wall described above, an aggregate of voxels between two adjacent segmented pores was defined as a neck. A value obtained by multiplying the number of voxels constituting such a neck by the square of the grid resolution (1.2 μm) (that is, the number of voxels×(1.2 μm)²) was defined as a neck area, and the average neck diameter was calculated by $\sqrt{(\text{neck area}/\pi)}$.

On the honeycomb filter of Example 1, the pressure loss performance and the trapping performance were evaluated in the following method. Table 1 shows the results.

Pressure Loss Performance Evaluation

In the pressure loss performance evaluation, the pressure loss increase value due to soot deposition (kPa) was determined in the following method. First, a fluid analysis was performed by Lattice Boltzmann Method using a predetermined relational expression regarding the flow of fluid between each lattice point and its adjacent lattice point when a fluid flows from an inflow end face, with the center point of each voxel of three-dimensional data of the porous body as each lattice point. The pressure difference between the inflow end face and an outflow end face was calculated as an initial pressure loss (kPa). Subsequently, based on the results of the fluid analysis, a flow rate vector consisting of a flow rate and a flow direction was derived for each spatial voxel of the three-dimensional data of the porous body as an information on the flow of the fluid for each spatial voxel. Next, the movement of PM was predicted by simulating a condition in which PM (soot) was placed on the flow of fluid represented by the flow fate vector. At this time, PM approaching an object voxel shall be trapped to the object voxel. When PM was deposited in about 1% of the pore volume, the fluid analysis was performed again to determine the pressure loss (kPa) after the soot deposition. The difference between the initial pressure loss and the pressure loss after the soot deposition was defined as a pressure loss increase value (kPa).

Trapping Performance Evaluation

In the method described in above evaluation method of the pressure loss performance evaluation, the movement of PM was predicted, and the amount of PM emitted from the outflow end face of the three-dimensional data of the porous body without being trapped was defined as the leakage amount (i.e., the soot emission amount (g/m³)).

Examples 2 to 7

In Examples 2 to 7, the honeycomb filters were manufactured using raw material as shown below in the preparation of kneaded material for making the honeycomb formed bodies. The obtained honeycomb filters were measured for the porosity and the average pore diameter of the partition wall in the same manner as in Example 1. The average number of branches of outermost surface pores of the partition wall and the average neck diameter at the surface of partition wall were also measured. Table 1 shows the results. In Examples 2 to 7, the average particle diameter of the water-absorbing polymer and the like, the blending ratio, and the water content to be added, in the raw material were changed.

Comparative Examples 1 to 3

In Comparative Examples 1 to 3, the honeycomb filters were manufactured using raw material as shown below in the preparation of kneaded material for making the honeycomb formed bodies. The obtained honeycomb filters were measured for the porosity and the average pore diameter of the partition wall in the same manner as in Example 1. The average number of branches of outermost surface pores of the partition wall and the average neck diameter at the surface of partition wall were also measured. Table 1 shows the results. In Comparative Examples 1 to 3, the average particle diameter of the water-absorbing polymer and the like, the blending ratio, and the water content to be added, in the raw material were changed. In addition, in some comparative examples, a pore-forming region was added to the pore former.

On the honeycomb filters of Example 2 to 7 and Comparative Examples 1 to 3, the pressure loss performance and the trapping performance were evaluated in the same manner as in Example 1. Table 1 shows the results.

Results

The honeycomb filters of Examples 1 to 7 showed a low-pressure loss increase value due to soot deposition (kPa) in the pressure loss performance evaluation. The honeycomb filters of Examples 1 to 7 also showed a low soot emission value in the trapping performance evaluation.

In the honeycomb filters of Comparative Examples 1 and 2, the average number of branches of the outermost surface pore of the partition wall was 7.5 or less, and the pressure loss increase value due to soot deposition (kPa) was higher in the pressure loss performance evaluation. In particular, in the honeycomb filter of Comparative Example 2, the average number of branches of the outermost surface pores was 7.5 or less and the average neck diameter of surface is smaller than other levels, so the pressure loss increase value (kPa) was very high.

Further, in the honeycomb filter of Comparative Example 3, since the average number of branches of the outermost surface pore was 7.5 or less, the pressure loss increase value due to soot deposition (kPa) was higher in the pressure loss performance evaluation.

INDUSTRIAL APPLICABILITY

The honeycomb filter according to the present invention can be used as a trapping filter for removing particulates and the like contained in exhaust gas.

DESCRIPTION OF REFERENCE NUMERALS

1: partition wall; 2: cell; 2a: inflow cell; 2b: outflow cell; 3: circumferential wall; 4: honeycomb structure body; 5: plugging portion; 11: first end face; 12: second end face; 16A,16B,16C,16D: pores; 17: constricted part; and 100: honeycomb filter.

What is claimed is:

1. A honeycomb filter comprising:
   a pillar-shaped honeycomb structure body having a porous partition wall disposed to surround a plurality of cells which serve as fluid through channels extending from a first end face to a second end face; and
   a plugging portion provided at an open end on the first end face or the second end face of each of the plurality of cells,
   wherein the partition wall has an average number of branches of pores existing at the outermost surface of the partition wall of greater than 7.5 and less than 9.0, and
   wherein the partition wall has an average neck diameter of a neck partitioning a plurality of pores on a surface of the partition wall of 6.0 μm or more and less than 9.0 μm.

2. The honeycomb filter according to claim 1, wherein a porosity of the partition wall is 45 to 65%.

3. The honeycomb filter according to claim 1, wherein an average pore diameter of the partition wall is 6.0 μm or more and 9.0 μm or less.

* * * * *